Aug. 13, 1968 D. M. PEEBLES 3,396,731

DEVICE FOR SUPPORTING FILES VISIBLY

Filed Dec. 9, 1966 3 Sheets-Sheet 1

INVENTOR

DAVID MEADE PEEBLES

BY B. P. Fishburne, Jr.

ATTORNEY

Aug. 13, 1968 D. M. PEEBLES 3,396,731

DEVICE FOR SUPPORTING FILES VISIBLY

Filed Dec. 9, 1966 3 Sheets-Sheet 2

INVENTOR
DAVID MEADE PEEBLES

BY B. P. Fishburne, Jr.
ATTORNEY

INVENTOR
DAVID MEADE PEEBLES

BY

B. P. Fishburne, Jr.
ATTORNEY

United States Patent Office 3,396,731

Patented Aug. 13, 1968

3,396,731

DEVICE FOR SUPPORTING FILES VISIBLY

David Meade Peebles, 325 Marcy Ave., Oxon Hill, Md. 20021

Filed Dec. 9, 1966, Ser. No. 600,475
5 Claims. (Cl. 129—16)

ABSTRACT OF THE DISCLOSURE

Open top filing boxes have stepped side wall extensions for the support of groups of suspension type files at distinctly different elevations, enabling the index tab of each file to be viewed from a remote point.

*Background of the invention*

The invention relates to that type of filing structure wherein file folders or jackets are suspended by bars from the top edges of the side walls of open top file storage boxes.

In the prior art devices of this character, a deficiency exists because all of the suspension files are supported at the same elevation and individual files are not viewable from a distance. It is usually necessary to finger through a large group of files in order to locate a particular one being sought.

*Summary of the invention*

According to the present invention, relatively small groups of files under a main index heading or individual headings are supported on vertically stepped side wall edges of the file storage box enabling all files to be viewed from a relatively remote point and rendering it quite unnecessary to finger through large numbers of individual files to locate a particular one. Relatively small groups of suspended files are prevented from comingling with files at a distinctly different elevation. The invention structure is modular and can be set up and dismantled with ease.

*Description of the preferred embodiment*

Figure 1:
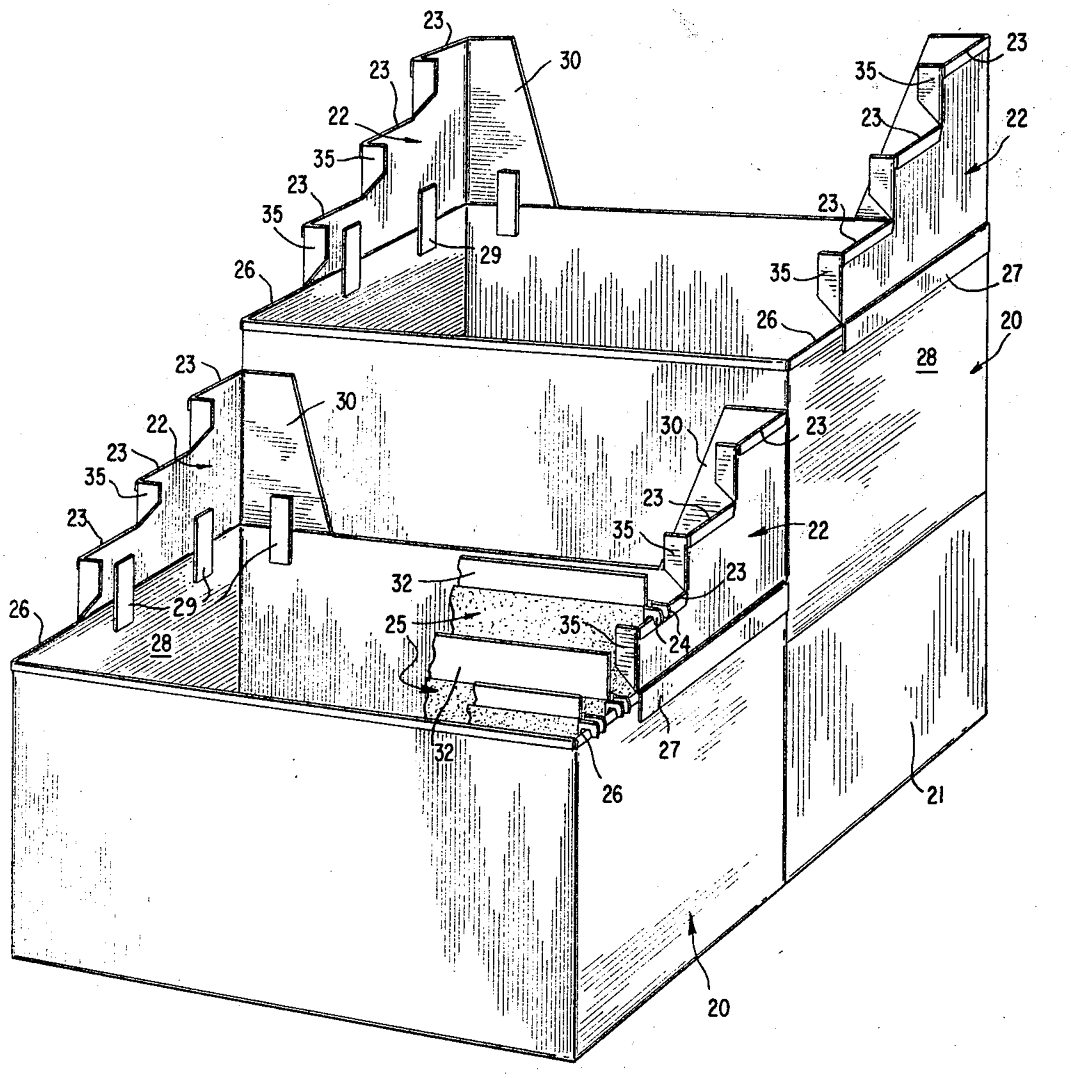
FIGURE 1 is a perspective view of a filing device embodying the invention.

Referring to the drawings, wherein like numerals are employed to designate like parts, the numeral 20 designates a well-known type of open top rectangular sheet metal storage box presently available on the market, and being ideally suited to the needs of the present invention. If preferred, however, a similar box formed of plastic or other material and having approximately the same proportions may be employed. The two boxes 20 shown in the drawings are identical and are separately formed for convenient manipulation in setting up and dismantling the filing structure. As shown, a dummy block or spacer

21 formed of any desired material is placed under the rearward storage box 20 to elevate the same to the desired height. The spacer 21 is placed immediately rearwardly of the forward box 20 as when both box elements are resting on a common level support, such as a table. If desired, instead of the spacer 21, the rear box 20 may have suitable legs and may be bracketed to the forward box 20. Such variations are contemplated within the scope of the invention.

Firmly and detachably mounted upon the side walls of the two boxes 20 are stepped side wall extensions 22 each including preferably three horizontal vertically stepped supporting edges 23 for the direct support of the bars 24 of suspension type filed folders 25. The forwardmost side wall upper edge portion 26 of each storage box 20 constitutes the fourth and lowest supporting edge or step for supporting files on each box unit of the structure. If desired, a different number or spacing of step elevations may be employed in the invention, although the drawings illustrate a preferred and very practical arrangement.

Each side wall extension 22 is provided upon its outer side with a dependent slightly offset flange 27 or clip extension which engages frictionally over the adjacent storage box side wall 28, as shown. Upon their inner sides, the extensions 22 carry anchoring tabs 29 which engage over the inner faces of box side walls 28. For added rigidity, the extensions 22 have rear right angular gussets 30 also provided with one of the tabs 29. If desired, the side wall extensions 22 instead of being separately formed attachments for the boxes 20 may be formed integrally therewith to produce the stepped supporting edges 23 on each box as shown in the drawings. As depicted in the drawings, the extensions 22 are readily detachable from the boxes, as when the total assembly is in a knock-down condition.

Figures 2, 3:
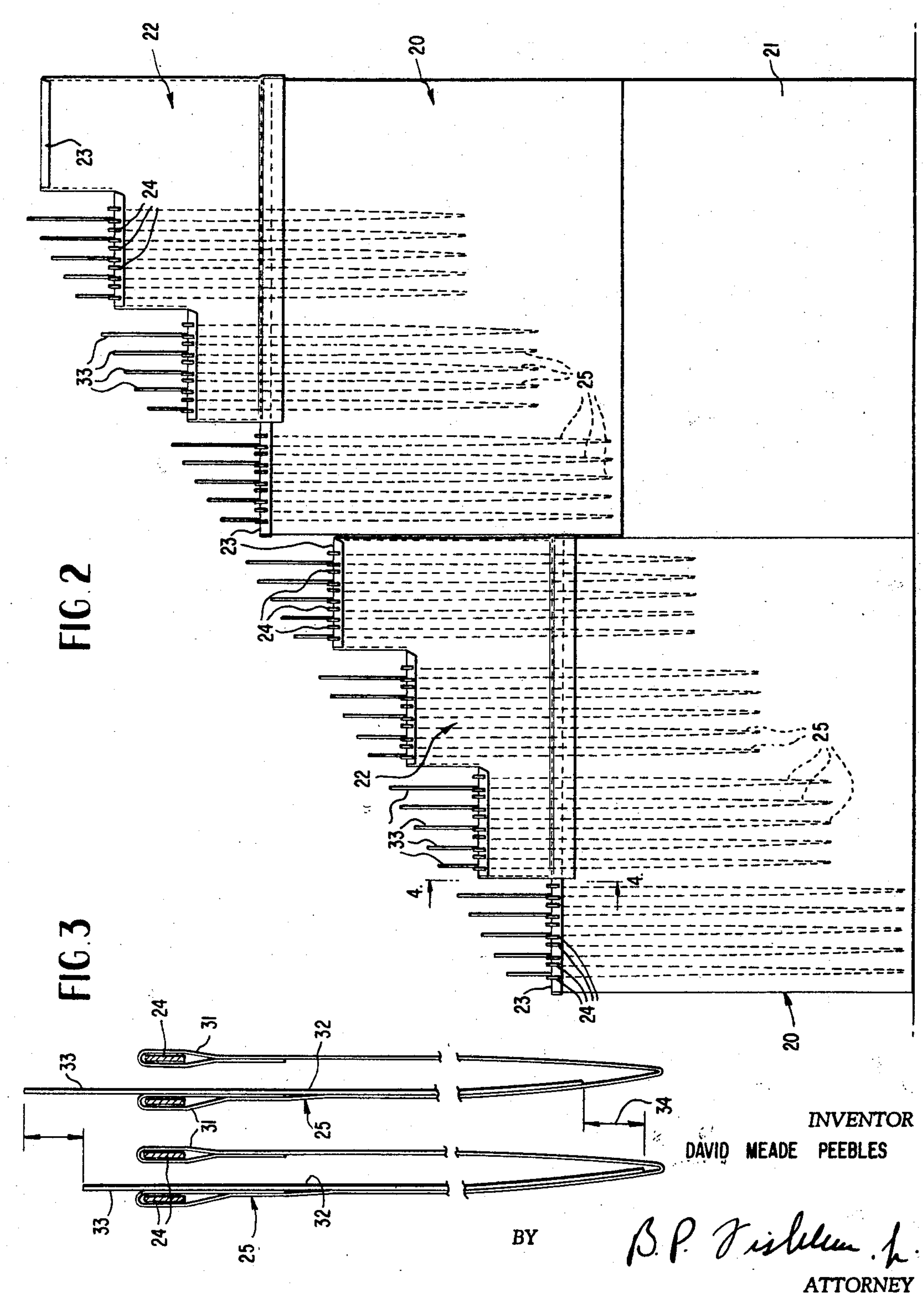
FIGURE 2 is a side elevation thereof.
FIGURE 3 is an enlarged fragmentary vertical section through adjacent file folders showing their individual construction.
Figure 4:
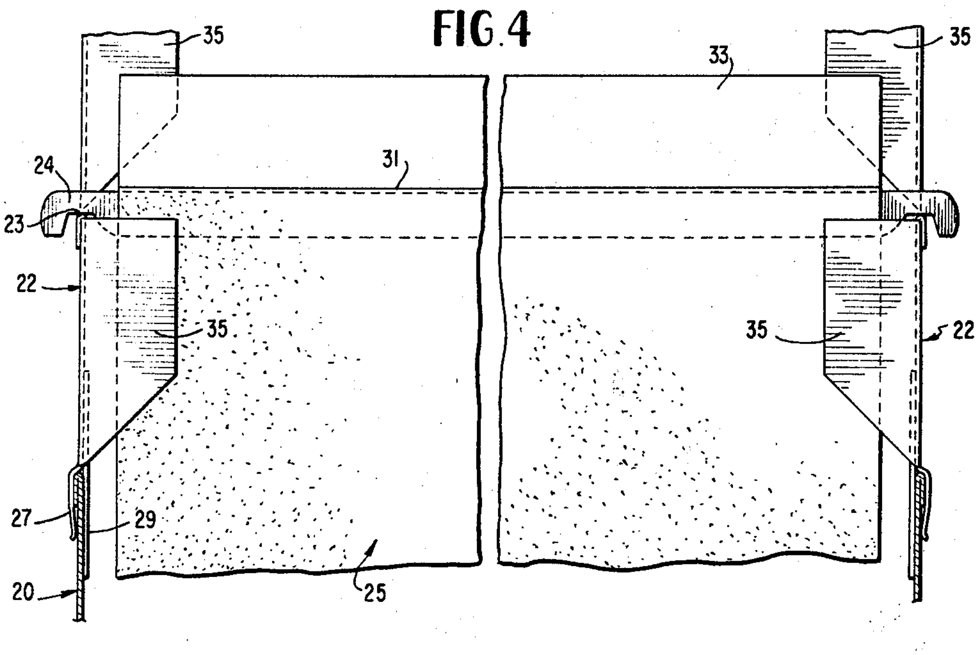
FIGURE 4 is an enlarged fragmentary vertical section taken on line 4—4 of FIGURE 2.
Figure 5:
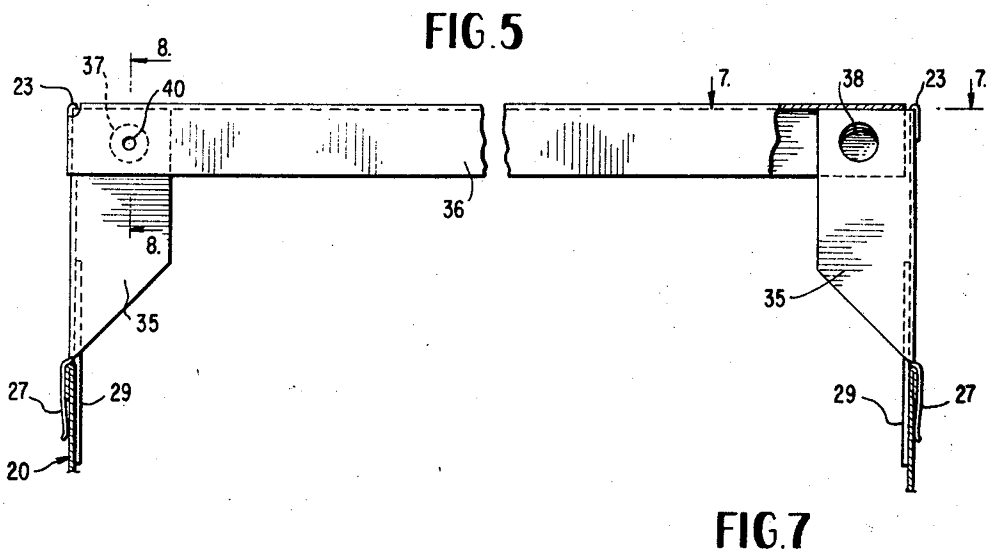
FIGURE 5 is an enlarged fragmentary side elevational view, partly in section, showing an optional brace member for box side wall extensions employed in the invention.
Figure 6:
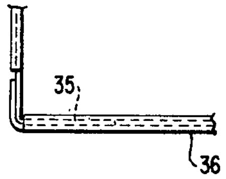
FIGURE 6 is a fragmenatry plan view of a corner of the structure shown in FIGURE 5.

Referring primarily to FIGURE 3, a pair of typical suspension type files or folders previously numbered 25 are shown. These generally are of a well known commercial type although slightly modified for the invention. Each file or folder 25 has a pair of the suspension bars 24 secured within tubular top end portions 31. The bars 24 have hook portions at their terminal ends which engage the stepped supporting edges 23 and 26, as shown in the drawings.

To enable index data to be readily applied to each file 25, a preferably stiff card or liner 32 may be applied adhesively to the inner surface of the front wall of each file 25 so that a top extended portion 33 of the card or liner will project somewhat above the normal top of the file. The same card or liner 32 may actually be used for each file 25 but its spacing from the bottom fold of the file may be varied as shown by the arrow 34 to produce the desired vertically stepped configuration. By this method, FIGURE 2, the groups of files 25 on each step or level of the extensions 22 are spaced upwardly from the next lowermost group and also the card extensions 33 of each file in each stepped group are also spaced vertically so that the tops of all cards lie in a common inclined plane. It is contemplated that indexing data or indicia will be provided upon the front of each card extension 33 so as to be clearly viewable from the front of the filing structure.

To prevent the relatively small groups of files suspended from the individual stepped edges 23 from sliding forwardly and dropping to the next level, inwardly projecting stop elements 35 are provided on the side wall extensions 22 at the forward terminal of each edge 23. These stop elements 35 overlap frontal edge portions of the files 25 to limit their forward displacement. Each pair of edges 23 may readily accommodate about five of the files 25, as shown, FIGURE 2, although this number may be varied in practice.

Figure 8:
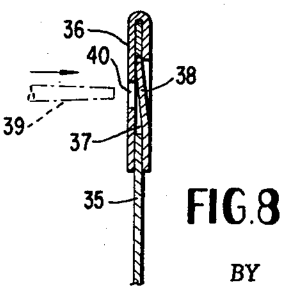
FIGURE 8 is a fragmentary vertical section taken on line 8—8 of FIGURE 5.
Figure 7:
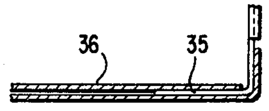
FIGURE 7 is a fragmentary horizontal section taken on line 7—7 of FIGURE 5.

FIGURES 5 through 8 shown an optional feature of the invention which has been omitted from FIGURE 1 and the other views. If it is desired to further strengthen the upstanding side wall extensions 22, brace bars 36 may be applied to the same at the front of each step or elevation, adjacent to the pairs of stop elements 35. As shown in FIGURES 5–8, each brace bar 36 may be U-shaped and may engage over the adjacent pair of elements 35. For further security, the elements 35 may be apertured as at 37, and a tab 38 struck from the bar 36 may be bent into the aperture 37 so as to lock the bar 36 against displacement. FIGURE 8 illustrates in broken lines at 39 a punch or implement which may be employed in conjunction with another small opening 40 in the bar 36 to dislodge the locking tab 38 so that the brace bar 36 could be removed. Other types of brace bars could be employed and the present arrangement in FIGURES 5 through 8 is merely one example of an attachment brace bar adaptable to the construction in FIGURE 1. It is thought that the construction in FIGURE 1 in most cases will be fully adequate without the necessity for further bracing.

It is believed that the usage of the filing device and its advantages should now be apparent to those skilled in the art without the necessity for any further description. Suffice it to say that relatively small groups of suspension files are mounted in uniformly stepped relation at plural elevations, in contrast with the more usual arrangement of supporting one large group of files at a common elevation. Also, as explained, the index tabs 33 or card extensions may be individually stepped within the small groups for further ease of viewing from a standing or sitting position. Furthermore, the small groups of files 25 at each step or level are easier to manipulate than one large group and overcrowding of the filing structure tends to be avoided. The construction does not interfere with normal usage of the suspension type files in other respects.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a modular stepped file assembly, a plurality of separately formed open top substantially rectangular filing boxes of substantially uniform size disposed one behind the other, a spacer element engageable beneath each box of said plurality except the first so that said boxes are supported in upwardly stepped relation from front to back with the fronts and backs of adjacent boxes substantially abutting and with their opposite side walls in common vertical planes, a pair of separable upstanding side wall extensions on the side walls of each filing box of somewhat lesser length than the front-to-back dimension of the box and extending forwardly from the rear wall of each box, the top edges of each pair of side wall extensions being notched to form stepped edge portions thereon, frontal sections of the top edges of the box side walls constituting lowermost steps at each box elevation, and clip elements on the bottoms of said side wall extensions engageable detachably and frictionally over the top edges of the box side walls and stabilizing the side wall extensions on the filing boxes, the arrangement providing a multiplicity of uniformly stepped supporting portions on the file assembly through its height upon which groups of suspension files are readily placed with the bodies of the files depending in the filing boxes.

2. In a modular stepped file assembly as defined by claim 1, and laterally interned stop tabs on the side wall extensions at the forward extremity of each stepped edge portion thereof and projecting inwardly of the box side walls and serving to arrest forward movement of the groups of suspension folders hung from said stepped edge portions.

3. In a modular stepped file assembly as defined by claim 2, and wherein said clip elements consist of flanges on the bottoms of the side wall extensions which engage outwardly of the box side walls, and depending tab elements on the side wall extensions which engage inwardly of the box side walls.

4. In a modular stepped file assembly as defined by claim 3, and substantially right angular laterally inwardly projecting reinforcing webs on the backs of the side wall extensions substantially in common vertical planes with the back walls of the filing boxes with which they are associated.

5. In a modular stepped file assembly as defined by claim 4, and wherein said filing boxes and side wall extensions and the parts thereof are constructed from stiff sheet material.

References Cited

UNITED STATES PATENTS

| | | | |
|---|---|---|---|
| 331,172 | 11/1885 | Webster | 312—184 |
| 1,268,143 | 6/1918 | Palmgren | 129—16 |
| 1,731,950 | 10/1929 | Tanner. | |
| 2,247,593 | 7/1941 | Weber | 129—16 |
| 2,312,594 | 3/1943 | Smith et al. | 211—72 |
| 2,955,372 | 10/1960 | Anthrop | 211—45 X |

FOREIGN PATENTS

| | | |
|---|---|---|
| 838,028 | 11/1938 | France. |
| 834,233 | 5/1960 | Great Britain. |
| 505,918 | 12/1954 | Italy. |

JEROME SCHNALL, *Primary Examiner.*